Patented Nov. 28, 1950

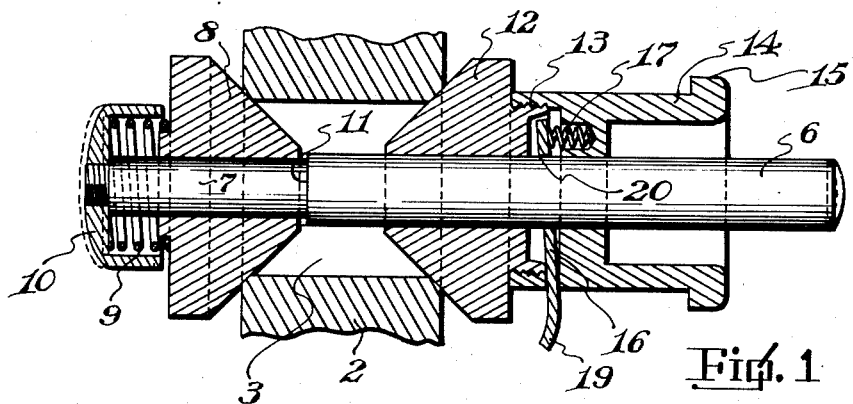
Fig. 1
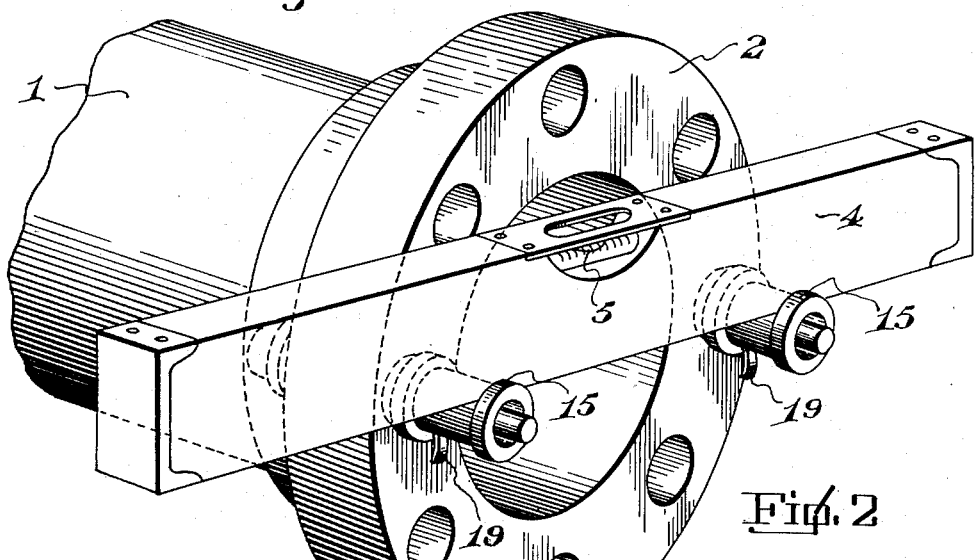
Fig. 2
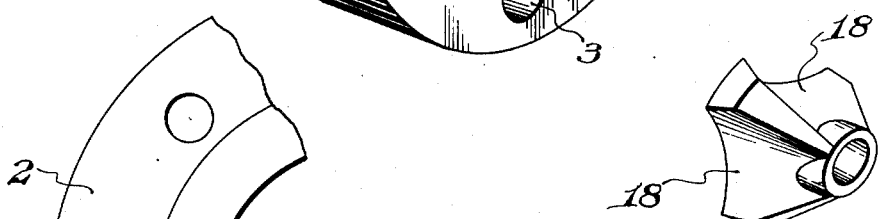
Fig. 3
Fig. 4
Arlie I. Zumwalt
INVENTOR.

2,531,799

UNITED STATES PATENT OFFICE 2,531,799

SUPPORT WITH CENTERING DEVICE

Arlie I. Zumwalt, Tulsa, Okla.

Application April 13, 1948, Serial No. 20,737

3 Claims. (Cl. 33—207)

The invention relates to a level support, adapted to be applied and centered in holes of a pipe flange to support a level in a horizontal position, so the axis of the holes of the flange may be horizontally positioned, preparatory to welding the flange on the pipe end.

A further object is to form the level supports from cooperating spring pressed cone members, which center themselves under spring action in the holes, said cone members being carried by a shaft extending axially through the cones, and one of said cones being provided with a latching member cooperating with the shaft for latching the parts together against the spring action.

A further object is to provide limited movement of one of the cones on the shaft to compensate for the lost movement of the latching member carried by the other cone member.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through one of the level supports, showing the same in one of the bolt holes of a pipe flange.

Figure 2 is a perspective view of one of the pipe ends, with flange in place, showing the level support applied thereto and a level on the support.

Figure 3 is a front elevation of the support and a portion of the pipe end.

Figure 4 is a perspective view of one of the rear cones.

Referring to the drawing, the numeral 1 designates a pipe section, and 2 an end flange positioned to be welded to the pipe end. In large pipe assemblies, around refineries and the like, the pipes 1 and flanges 2 are assembled and welded together at the point of installation, and in these heavy pipe sections it is necessary to get opposite holes 3, of the flanges 2, in a horizontal plane so the pipe sections, after the flanges are welded thereon, can be accurately alined and bolted together.

To accomplish the leveling operation, a spirit level 4 is used, as shown in Figure 2. The supports for the level are placed in opposite holes 3 and the flange rotated until the bubble 5 of the level, indicates a level position. To properly support the level, level supports are placed at each side, and for purposes of illustration, one only is shown in detail, however both are similarly constructed.

Each support comprises a shaft 6, one end of which is reduced as shown at 7, and has slidably mounted thereon a centering cone 8. The centering cone 8 is forced into the rear side of the opening 3 by an expansion spring 9 interposed between the cone 8, and the cap 10, threaded on the reduced end of the shaft 6. It will be noted that the shaft 6 is provided with a shoulder 11, which allows limited axial movement of the shaft and cone 8 under the influence of the expansion spring 9, so the parts hereinafter set forth may be held under tension of the spring 9. Extending into the opposite sides of the hole 3 is a second centering cone 12, and threaded on the outer side of the cone 12, at 13, is a cylindrical level supporting member 14. It will be noted that the level 4 will be supported between the flange 15 and the cone 12, thereby preventing side displacement of the level during a leveling operation.

Disposed within the cylindrical member 14 is a transom latch 16, through which latch the shaft 6 extends. It will be noted that when the cone 12 and cylindrical member 14 are forced onto the shaft 6, when the parts are in the position shown in Figure 1, the latch will tilt against the action of the spring 17, and will latch the cones in position. At this point, inward pressure is applied to the cap 10 against the expansion spring 9, hence any lost motion in the transom latch 16 will be taken up. Sides of the cones 8 and 12 are recessed as shown at 18 so the cones can come close to the raised face of the flange as shown in Figure 3. To release the supports it will only be necessary to apply pressure on the finger engaging members 19 for breaking the bite of the transom latches at 20.

From the above it will be seen that a level support is provided which is simple in construction, may be easily and quickly applied and properly centered, and that the axis of the bolts holes may be positively positioned in a horizontal plane, preparatory to the flange welding operation.

The invention having been set forth what is claimed as new and useful is:

1. A centering device adapted to be supported in an aperture extending through a member, said centering device comprising a shaft extending through the aperture, a spring pressed cone slidably mounted on one end of the shaft and engaging one end of the aperture, a spring carried by the shaft and cooperating with said cone for urging the cone towards the aperture end, a second cone slidably mounted on the shaft and reversely positioned in relation to the first mentioned cone, a cylindrical sleeve detachably connected to the second cone on its outer side, a latch chamber formed in the second cone and cylindrical sleeve, a rockable latch member in said chamber and through which latch member the shaft extends, spring means cooperating with one end of the latch member for rocking the same and gripping the shaft and means for controlling said latch member from outside the sleeve.

2. A device as set forth in claim 1 wherein the spring means for rocking the latch member comprises an expansion spring interposed between the sleeve and the end of the rockable latch member.

3. A device as set forth in claim 1 wherein the rockable latch member is provided with a finger engaging member extending through an aperture in the sleeve between the sleeve and the second cone member.

ARLIE I. ZUMWALT.

REFERENCES CITED

The following references are of record in the file of this patent:

UNITED STATES PATENTS

| Number | Name | Date |
|---|---|---|
| 566,851 | Ferguson | Sept. 1, 1896 |
| 1,240,528 | Alsworth | Sept. 18, 1917 |
| 1,978,759 | Phelps | Oct. 30, 1934 |
| 2,180,929 | Murphy | Nov. 21, 1939 |
| 2,214,758 | Bell | Sept. 17, 1940 |
| 2,233,371 | Smith | Feb. 25, 1941 |
| 2,323,039 | Hill | June 29, 1943 |